US012526388B2

(12) United States Patent
Sawai

(10) Patent No.: US 12,526,388 B2
(45) Date of Patent: Jan. 13, 2026

(54) DRIVER IMAGING DEVICE

(71) Applicant: TOYOTA JIDOSHA KABUSHIKI KAISHA, Toyota (JP)

(72) Inventor: Shunichiroh Sawai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/775,361

(22) Filed: Jul. 17, 2024

(65) Prior Publication Data

US 2025/0080698 A1     Mar. 6, 2025

(30) Foreign Application Priority Data

Aug. 29, 2023   (JP) ................................. 2023-138827

(51) Int. Cl.
*H04N 7/18*      (2006.01)
*G06T 7/70*      (2017.01)
*H04N 23/60*     (2023.01)

(52) U.S. Cl.
CPC ................. *H04N 7/18* (2013.01); *G06T 7/70* (2017.01); *H04N 23/60* (2023.01); *G06T 2207/30201* (2013.01); *G06T 2207/30268* (2013.01)

(58) Field of Classification Search
None
See application file for complete search history.

(56) References Cited

U.S. PATENT DOCUMENTS

2019/0037121 A1*   1/2019   Nakata ................... H04N 23/73
2020/0198574 A1*   6/2020   Tsutsui .................... B60R 22/34
2023/0382299 A1*   11/2023   Dsa ........................ G06V 20/597

FOREIGN PATENT DOCUMENTS

JP     2008-210239 A     9/2008
JP     2016-034810 A     3/2016
JP     2022-142147 A     9/2022

* cited by examiner

*Primary Examiner* — Eileen M Adams
(74) *Attorney, Agent, or Firm* — Sughrue Mion, PLLC

(57) ABSTRACT

A driver imaging device 1 includes a driver monitor camera 10 fixed to a vehicle front side with respect to a driver's seat in a vehicle interior of a vehicle, and configured to capture an image of a driver. The driver monitor camera 10 includes a camera ECU 11. The camera ECU 11 estimates a traveling direction of the vehicle based on at least one of acceleration information of an acceleration sensor 2 of the vehicle and acceleration information of an in-camera acceleration sensor 12 built into the driver monitor camera 10, and determines a face orientation of the driver with respect to the traveling direction of the vehicle and a gaze point of the driver based on a face image of the driver captured by the driver monitor camera 10 and the traveling direction.

8 Claims, 3 Drawing Sheets

DRIVER IMAGING DEVICE

CROSS-REFERENCE TO RELATED APPLICATIONS

This application is based upon and claims the benefit of priority from Japanese Patent Application No. 2023-138827, filed on Aug. 29, 2023, and the entire contents of which are incorporated herein by reference.

TECHNICAL FIELD

The present disclosure relates to a driver imaging device.

BACKGROUND

Japanese Unexamined Patent Publication No. 2016-34810 is known as a technical document regarding a conventional driver imaging device. Japanese Unexamined Patent Publication No. 2016-34810 discloses a device that calculates the degree of concentration of a driver on a driving operation from a deviation angle between a traveling direction of a vehicle and a line-of-sight direction of the driver. The traveling direction of the vehicle is calculated based on a vehicle speed and a steering angle.

SUMMARY

In order to determine a face orientation of the driver with respect to the traveling direction of the vehicle and a gaze point of the driver, at least one of various pre-settings based on vehicle interior design information and strict alignment of a driver monitor camera when mounted are required. In addition, when a misalignment of the driver monitor camera occurs due to vibration or the like caused by the traveling of the vehicle, a determination error occurs, and a calibration cost for correcting the determination error is incurred.

An object of the present disclosure is to provide a driver imaging device capable of reducing a calibration cost while eliminating the need for at least one of pre-setting and strict alignment of a driver monitor camera.

A driver imaging device of the present disclosure includes a driver monitor camera fixed to a vehicle front side with respect to a driver's seat in a vehicle interior of a vehicle, and configured to capture an image of a driver. The driver monitor camera includes a camera ECU. The camera ECU estimates a traveling direction of the vehicle based on at least one of acceleration information of an acceleration sensor of the vehicle and acceleration information of an in-camera acceleration sensor built into the driver monitor camera, and determines a face orientation of the driver with respect to the traveling direction of the vehicle and a gaze point of the driver based on a face image of the driver captured by the driver monitor camera and the traveling direction.

According to the present disclosure, it is possible to provide the driver imaging device capable of reducing a calibration cost while eliminating the need for at least one of pre-setting and strict alignment of the driver monitor camera.

DETAILED DESCRIPTION

Hereinafter, an embodiment of the present disclosure will be described with reference to the drawings.

Figure 1:
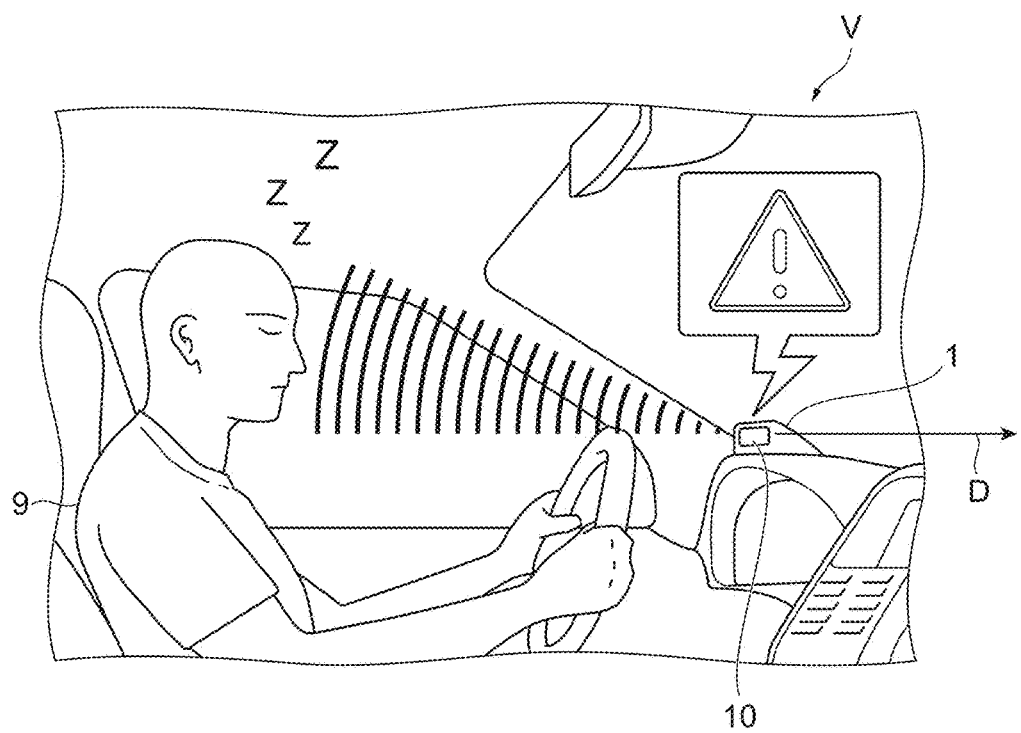
FIG. 1 is a view showing a vehicle in which a driver imaging device according to an embodiment is mounted.
Figure 2:
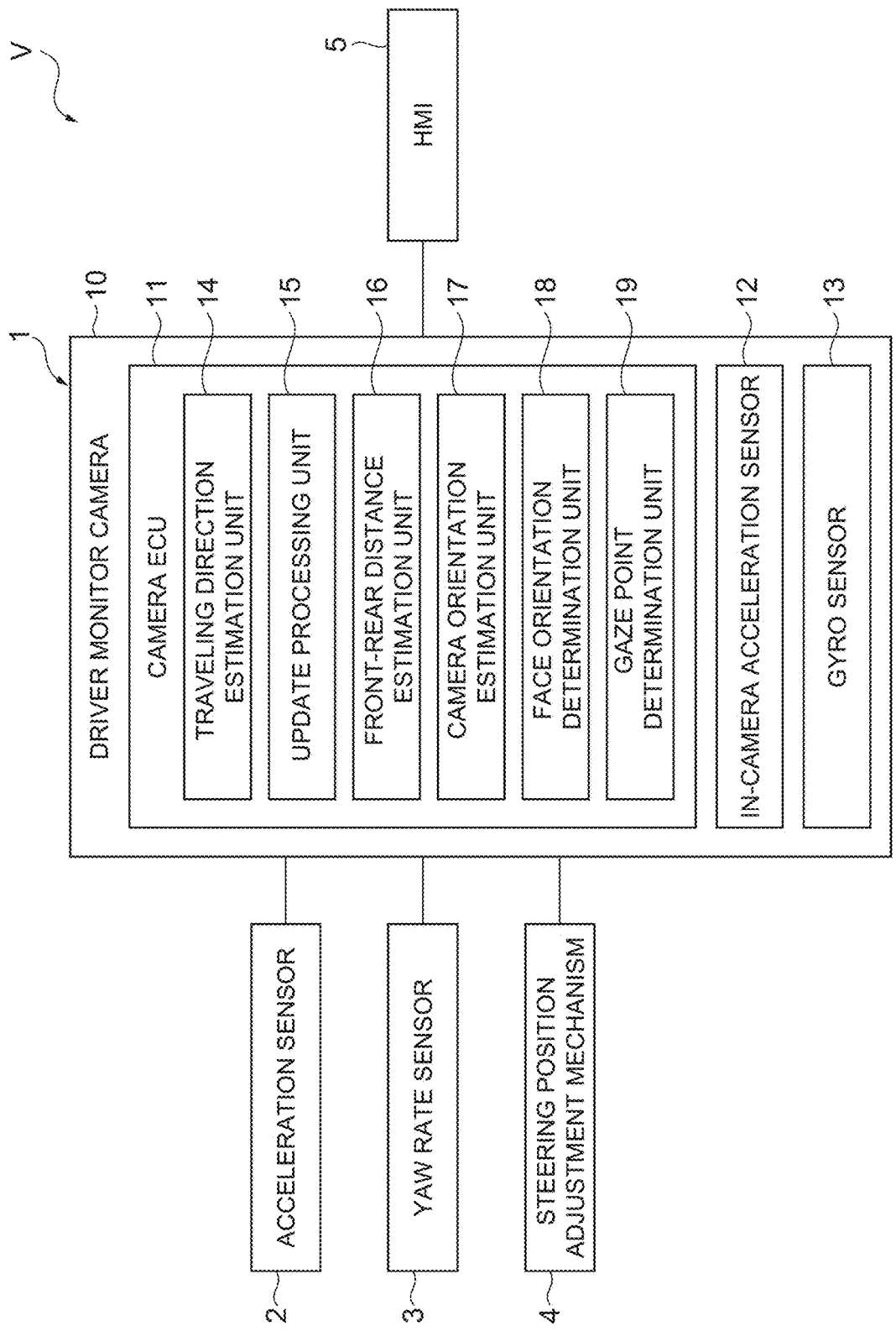
FIG. 2 is a block diagram of a functional configuration of the vehicle shown in FIG. 1.

FIG. 1 is a view showing a vehicle in which a driver imaging device according to an embodiment is mounted. FIG. 2 is a block diagram of a functional configuration of the vehicle shown in FIG. 1. As shown in FIGS. 1 and 2, a vehicle V includes a driver imaging device 1, an acceleration sensor 2, a yaw rate sensor 3, a steering position adjustment mechanism 4, and a human machine interface (HMI) 5.

The driver imaging device 1 includes a driver monitor camera 10. The driver monitor camera 10 is fixed at a position in front of a driver's seat in a vehicle interior of the vehicle V. The driver monitor camera 10 captures an image of a driver 9. The driver monitor camera 10 captures an image of the face of the driver 9. The driver monitor camera 10 includes a camera ECU 11, an in-camera acceleration sensor 12, and a gyro sensor 13.

The camera ECU 11 is built into the driver monitor camera 10. The camera ECU 11 is not a vehicle ECU. The camera ECU 11 is an electronic control unit including a central processing unit (CPU), a storage unit such as a read only memory (ROM) or a random access memory (RAM), and the like. In the camera ECU 11, for example, the CPU executes a program stored in the storage unit, to realize various functions.

The in-camera acceleration sensor 12 is built into the driver monitor camera 10. The in-camera acceleration sensor 12 detects an acceleration of the driver monitor camera 10. The in-camera acceleration sensor 12 detects, for example, an acceleration of the driver monitor camera 10 in a front-rear direction and a lateral acceleration of the driver monitor camera 10. The in-camera acceleration sensor 12 transmits acceleration information of the driver monitor camera 10 to the camera ECU 11.

The gyro sensor 13 is built into the driver monitor camera 10. The gyro sensor 13 measures a yaw rate (rotational angular speed) of the driver monitor camera 10. The gyro sensor 13 transmits angular speed information of the driver monitor camera 10 to the camera ECU 11.

The acceleration sensor 2 is mounted in the vehicle V. The acceleration sensor 2 detects an acceleration of the vehicle V. The acceleration sensor 2 detects, for example, an acceleration of the vehicle V in the front-rear direction and a lateral acceleration of the vehicle V. The acceleration sensor 2 transmits, for example, acceleration information of the vehicle V to the camera ECU 11.

The yaw rate sensor 3 detects a yaw rate (rotational angular speed) of the vehicle V around a vertical axis of the center of gravity of the vehicle V. The yaw rate sensor 3 is, for example, a gyro sensor or the like. The yaw rate sensor 3 transmits yaw rate information of the vehicle V to the camera ECU 11.

The steering position adjustment mechanism 4 adjusts a steering position of the vehicle V. The steering position adjustment mechanism 4 includes an actuator that controls a front-rear position of a steering wheel through a telescopic mechanism of the steering wheel. The steering position adjustment mechanism 4 includes an actuator that controls an up-down position of the steering wheel through a tilt mechanism of the steering wheel. When the steering position of the vehicle V is adjusted, the steering position adjustment mechanism 4 transmits steering position information to the camera ECU 11.

An HMI 5 is an interface for inputting and outputting information between the vehicle and an occupant in response to a control signal from the camera ECU 11. The HMI 5 includes a display, a speaker, or the like. The HMI 5 makes a notification to the occupant of the vehicle V. The HMI 5 makes a notification of, for example, the status of a face orientation and a gaze point of the driver 9. For example, the HMI 5 makes a notification to encourage an improvement in the degree of concentration.

The camera ECU 11 includes, as functional configurations, a traveling direction estimation unit 14, an update processing unit 15, a front-rear distance estimation unit 16, a camera orientation estimation unit 17, a face orientation determination unit 18, and a gaze point determination unit 19.

The traveling direction estimation unit 14 estimates a traveling direction D of the vehicle V based on at least one of the acceleration information of the acceleration sensor 2 of the vehicle V and the acceleration information of the in-camera acceleration sensor 12. The traveling direction estimation unit 14 estimates the traveling direction D of the vehicle V, for example, based on the angular speed information of the yaw rate sensor 3 of the vehicle V in addition to the acceleration information. The traveling direction estimation unit 14 may estimate the traveling direction D of the vehicle V based on the angular speed information of the gyro sensor 13 of the driver monitor camera 10 in addition to the acceleration information. The traveling direction estimation unit 14 may estimate the traveling direction D of the vehicle V, for example, based on a detection result of a geomagnetic sensor of the vehicle V in addition to the acceleration information. The traveling direction estimation unit 14 may estimate the traveling direction D of the vehicle V based on information from the global navigation satellite system (GNSS) or the like in addition to the acceleration information.

The traveling direction estimation unit 14 estimates the traveling direction D of the vehicle V at each predetermined period. The predetermined period may be 0.5 seconds, 1 second, 3 seconds, 5 seconds, or 10 seconds or more.

When a predetermined condition is satisfied, the update processing unit 15 performs an update process to update the estimation result of the traveling direction D of the vehicle V by the traveling direction estimation unit 14. Specifically, if the driver monitor camera 10 is a steering column-mounted type, the update processing unit 15 performs an update process of the estimation result of the traveling direction D of the vehicle V when a steering position adjustment is performed by the steering position adjustment mechanism 4 of the vehicle V. The update processing unit 15 performs an update process of the estimation result of the traveling direction D of the vehicle V regardless of whether the predetermined period elapses. Namely, the update processing unit 15 causes the traveling direction estimation unit 14 to re-estimate the traveling direction D of the vehicle V when the steering position adjustment is performed.

For example, when a change in the front-rear position of the steering wheel with respect to the driver 9 is a certain value or more, the update processing unit 15 determines that the steering position adjustment is performed, and causes the traveling direction D of the vehicle V to be re-estimated. Alternatively, when a change in the angle of the steering wheel in an up-down direction is a certain angle or more, the update processing unit 15 determines that the steering position adjustment is performed, and causes the traveling direction D of the vehicle V to be re-estimated. If the driver monitor camera 10 is mounted on a rearview mirror, when the position adjustment of the rearview mirror is performed, the update processing unit 15 may perform an update process for the estimation result of the traveling direction D of the vehicle V regardless of whether the predetermined period elapses.

If the driver's seat of the vehicle V is an electric seat, the front-rear distance estimation unit 16 estimates a front-rear distance between the driver monitor camera 10 and the driver 9 based on front-rear position information of the driver's seat. The front-rear distance estimation unit 16 can estimate the front-rear distance between the driver monitor camera 10 and the driver 9 by taking into account a change in the front-rear position of the driver's seat with respect to a reference value of the front-rear distance stored in advance. The reference value of the front-rear distance is, for example, a front-rear distance between the driver monitor camera 10 and a virtual driver at least one of the design stage or the shipping stage of the vehicle V. The front-rear distance estimation unit 16 may calculate a difference in the front-rear direction between a relative position of the driver monitor camera 10 with respect to a predetermined reference position of the vehicle V and a relative position of the driver's seat with respect to the reference position of the vehicle V as the front-rear distance between the driver monitor camera 10 and the driver 9.

The front-rear distance estimation unit 16 may estimate the front-rear distance between the driver monitor camera 10 and the driver 9 based on a vehicle interior image captured by the driver monitor camera 10. In this case, the driver's seat does not need to be an electric seat. The front-rear distance estimation unit 16 estimates the front-rear distance between the driver monitor camera 10 and the driver 9, for example, from the disposition of structures in an image of vehicle interior equipment of the vehicle V. Specifically, the front-rear distance estimation unit 16 estimates the front-rear distance between the driver monitor camera 10 and the driver 9, for example, based on the shape, position, or the like of a part of the driver's seat (such as a part or the entirety of a headrest or the like), a part of a passenger seat, a ceiling light, a seatbelt retractor, or the like in the vehicle interior image.

The camera orientation estimation unit 17 estimates an orientation of the driver monitor camera 10 based on the vehicle interior image captured by the driver monitor camera 10. The camera orientation estimation unit 17 estimates the orientation of the driver monitor camera 10, for example, from the disposition of the structures in the image of the vehicle interior equipment of the vehicle V. Specifically, the camera orientation estimation unit 17 estimates the orientation of the driver monitor camera 10, for example, based on a positional relationship between a part of the driver's seat, a part of the passenger seat, the ceiling light, the seatbelt retractor, a handrail for getting on and off, which is provided at an upper portion of the vehicle interior, and the like in the vehicle interior image.

The face orientation determination unit 18 determines a face orientation of the driver 9 with respect to the traveling direction D of the vehicle V. The face orientation determination unit 18 performs a determination on the face orientation based on a face image of the driver 9 captured by the driver monitor camera 10, the traveling direction D of the vehicle V estimated by the traveling direction estimation unit 14, the front-rear distance between the driver monitor camera 10 and the driver 9 estimated by the front-rear distance estimation unit 16, and the orientation of the driver monitor camera 10 estimated by the camera orientation estimation unit 17.

The face orientation determination unit 18 calculates, for example, a relative angle between the face orientation of the driver 9 and the traveling direction D of the vehicle V. The face orientation determination unit 18 determines, for example, whether the relative angle between the face orientation of the driver 9 and the traveling direction D of the vehicle V is larger than a threshold value for a predetermined period or longer. The threshold value may be determined, for example, based on a vehicle speed of the vehicle V. For example, the larger the vehicle speed of the vehicle V is, the smaller the threshold value may tend to be. The face orientation determination unit 18 determines, for example, whether a state where the relative angle between the face orientation of the driver 9 and the traveling direction D of the vehicle V is larger than the threshold value elapses for a predetermined period determined in advance or more. When the state where the relative angle between the face orientation of the driver 9 and the traveling direction D of the vehicle V is larger than the threshold value elapses for the predetermined period or more, the face orientation determination unit 18 determines that there is a possibility that the driver 9 does not properly check the traveling direction D of the vehicle V (for example, looking aside or the like).

The gaze point determination unit 19 determines a gaze point of the driver 9 with respect to the traveling direction D of the vehicle V based on the face image of the driver 9 captured by the driver monitor camera 10, the traveling direction D of the vehicle V estimated by the traveling direction estimation unit 14, the front-rear distance between the driver monitor camera 10 and the driver 9 estimated by the front-rear distance estimation unit 16, and the orientation of the driver monitor camera 10 estimated by the camera orientation estimation unit 17.

The gaze point determination unit 19 calculates, for example, a relative angle between a gaze direction of the driver 9 and the traveling direction D of the vehicle V. The gaze point determination unit 19 determines, for example, whether the relative angle between the gaze direction of the driver 9 and the traveling direction D of the vehicle V is larger than a threshold value for a predetermined period or longer. The threshold value may be determined, for example, based on a vehicle speed of the vehicle V. For example, the larger the vehicle speed of the vehicle V is, the smaller the threshold value may tend to be. The gaze point determination unit 19 determines, for example, whether a state where the relative angle between the gaze direction of the driver 9 and the traveling direction D of the vehicle V is larger than the threshold value elapses for a predetermined period determined in advance or more. When the state where the relative angle between the gaze direction of the driver 9 and the traveling direction D of the vehicle V is larger than the threshold value elapses for the predetermined period or more, the gaze point determination unit 19 determines that there is a possibility that the driver 9 does not properly check the traveling direction D of the vehicle V (for example, looking aside or the like).

When the relative angle between the face orientation of the driver 9 and the traveling direction D of the vehicle V is larger than the threshold value elapses for the predetermined period or more, the camera ECU 11 alerts the driver 9 via the speaker, the display, or the like of the HMI 5. When the relative angle between the gaze direction of the driver 9 and the traveling direction D of the vehicle V is larger than the threshold value elapses for the predetermined period or more, the camera ECU 11 alerts the driver 9 via the speaker, the display, or the like of the HMI 5.

Figure 3:
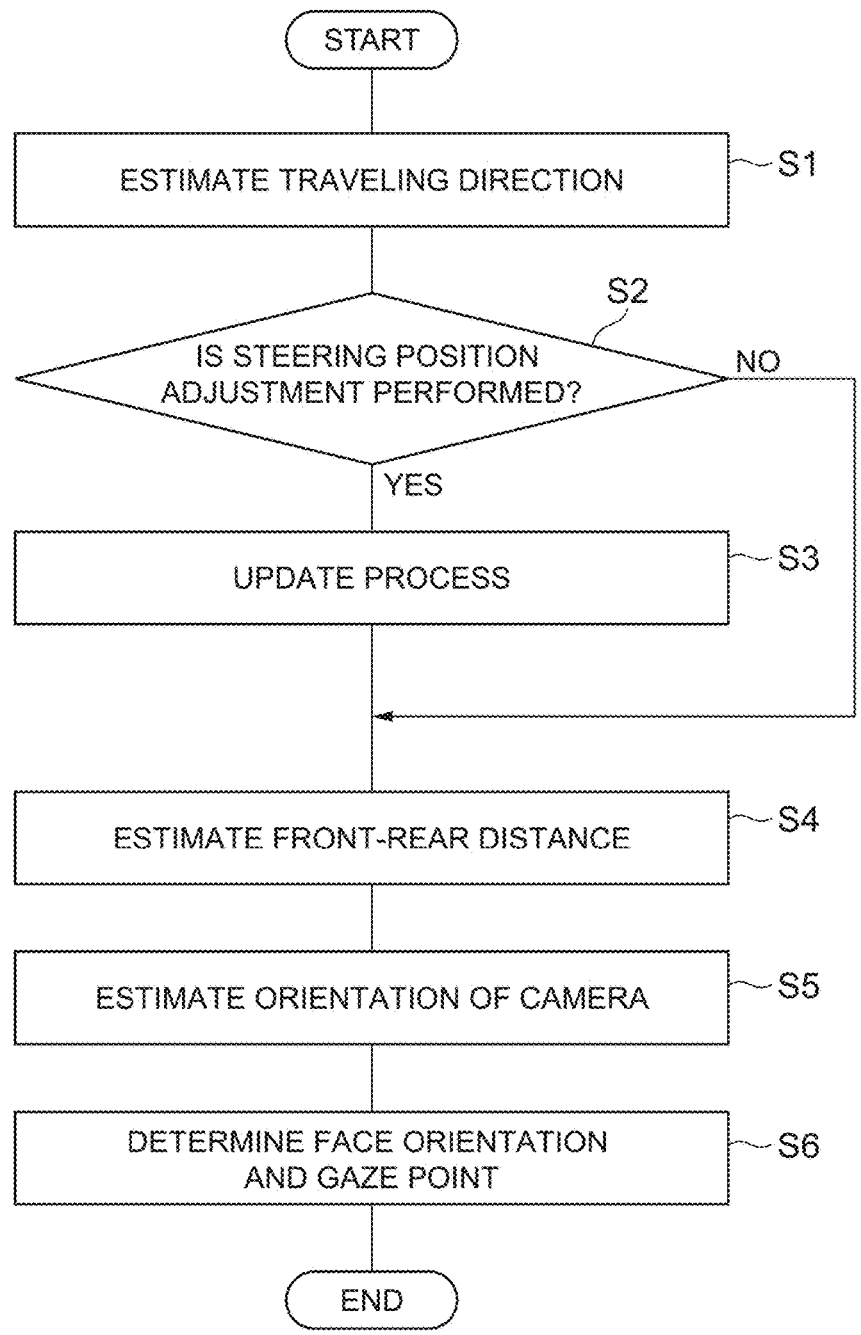
FIG. 3 is a flowchart showing a process performed by a camera ECU shown in FIG. 2.

Next, a process of the camera ECU 11 will be described. FIG. 3 is a flowchart showing the process performed by the camera ECU 11.

As shown in FIG. 3, the camera ECU 11 estimates the traveling direction D of the vehicle V in step S1. In step S2, the camera ECU 11 determines whether the steering position adjustment of the vehicle V is performed. When the camera ECU 11 determines that the steering position adjustment of the vehicle V is performed (step S2: YES), the camera ECU 11 proceeds to step S3. When the camera ECU 11 determines that the steering position adjustment of the vehicle V is not performed (step S2: NO), the camera ECU 11 proceeds to step S4.

In step S3, the camera ECU 11 performs an update process of the estimation result of the traveling direction D of the vehicle V. In step S4, the camera ECU 11 estimates the front-rear distance between the driver monitor camera 10 and the driver 9. In step S5, the camera ECU 11 estimates the orientation of the driver monitor camera 10. In step S6, the camera ECU 11 determines the face orientation and the gaze point of the driver 9 with respect to the traveling direction D of the vehicle V based on the face image of the driver 9, the traveling direction D of the vehicle V, the front-rear distance between the driver monitor camera 10 and the driver 9, and the orientation of the driver monitor camera 10.

As described above, according to the driver imaging device 1, since the camera ECU 11 of the driver monitor camera 10 determines the face orientation and the gaze point of the driver 9 with respect to the traveling direction D of the vehicle V by estimating the traveling direction D of the vehicle V, compared to a conventional device in which a mounting position of the driver monitor camera 10, the orientation of the driver monitor camera 10, vehicle interior design information of the vehicle V, the face orientation of the driver 9, three-dimensional geometric information in front of the driver's seat in the vehicle interior, which is used to determine the gaze point, and the like are set in advance, and in which the driver monitor camera 10 is strictly aligned when mounted, it is possible to determine the face orientation and the gaze point of the driver 9 with respect to the traveling direction D of the vehicle V while eliminating the need for at least one of pre-setting and strict alignment. In addition, since the traveling direction D of the vehicle V is estimated by the camera ECU 11, the calibration cost can be reduced.

The camera ECU 11 estimates the traveling direction D of the vehicle V based on at least one of the angular speed information of the yaw rate sensor 3 of the vehicle V and the angular speed information of the gyro sensor 13 built into the driver monitor camera 10, in addition to at least one of the acceleration information of the acceleration sensor 2 and the acceleration information of the in-camera acceleration sensor 12. Accordingly, by estimating the traveling direction D of the vehicle V based on the angular speed information that changes as the vehicle V travels, the accuracy of estimating the traveling direction D of the vehicle V can be improved compared to when the angular speed information is not taken into account.

If the driver's seat of the vehicle V is an electric seat, the camera ECU 11 estimates the front-rear distance between the driver monitor camera 10 and the driver 9 based on the front-rear position information of the driver's seat, and determines the face orientation and the gaze point of the driver 9 based on the front-rear distance, the face image of the driver 9, and the traveling direction D. Accordingly, by estimating the front-rear distance between the driver monitor camera 10 and the driver 9 based on the front-rear position information of the driver's seat that is an electric seat, and determining the face orientation of the driver 9 while taking into account the front-rear distance, the accuracy of determining the face orientation and the gaze point of the driver 9 can be improved compared to when the front-rear distance between the driver monitor camera 10 and the driver 9 is not taken into account.

If the driver monitor camera 10 is a steering column-mounted type, the camera ECU 11 performs an update process of the estimation result of the traveling direction D of the vehicle V when a steering position adjustment is performed by the steering position adjustment mechanism 4 of the vehicle V. Accordingly, if the driver monitor camera 10 is a steering column-mounted type, at least one of the position and the orientation of the driver monitor camera 10 is changed when the steering position adjustment is performed by the steering position adjustment mechanism 4 of the vehicle V, so that the occurrence of a deviation in the traveling direction D of the vehicle V estimated by the camera ECU 11 can be suppressed by performing an update process of the estimation result of the traveling direction D of the vehicle V.

The camera ECU 11 estimates the orientation of the driver monitor camera 10 and the front-rear distance between the driver monitor camera 10 and the driver 9 from the disposition of the vehicle interior equipment of the vehicle V in the image based on the vehicle interior image captured by the driver monitor camera 10, and determines the face orientation and the gaze point of the driver 9 based on the orientation of the driver monitor camera 10, the front-rear distance, the face image of the driver 9, and the traveling direction D. Accordingly, by estimating the orientation of the driver monitor camera 10 and the front-rear distance between the driver monitor camera 10 and the driver 9 through image processing from the disposition of the vehicle interior equipment such as the driver's seat or the passenger seat, the ceiling light, and the like in the image based on the vehicle interior image captured by the driver monitor camera 10, the accuracy of determining the face orientation and the gaze point of the driver 9 can be improved compared to when at least one of the orientation of the driver monitor camera 10 and the front-rear distance is not taken into account.

According to the driver imaging device 1 of the present disclosure, since the traveling direction D of the vehicle V can be estimated regardless of the mounting position of the driver monitor camera 10, the design of the mounting position of the driver monitor camera 10 may not be changed for each vehicle V. In other words, the degree of freedom in designing the mounting position of the driver monitor camera 10 is improved.

The embodiment of the present disclosure has been described above; however, the present disclosure is not limited to the above-described embodiment. The present disclosure can be implemented in various modes with various changes and improvements made based on the knowledge of those skilled in the art, including the above-described embodiment.

The traveling direction estimation unit 14 may not rely on the angular speed information of the yaw rate sensor 3 of the vehicle V and the angular speed information of the gyro sensor 13 of the driver monitor camera 10 when estimating the traveling direction D of the vehicle V.

The traveling direction estimation unit 14 may estimate the traveling direction D of the vehicle V based on only the detection result of the acceleration sensor 2. Accordingly, a low cost through, for example, controller area network (CAN) communication can be realized.

The face orientation determination unit 18 does not necessarily require using the front-rear distance between the driver monitor camera 10 and the driver 9 estimated by the front-rear distance estimation unit 16, when determining the face orientation of the driver 9. In addition, the face orientation determination unit 18 does not necessarily require using the orientation of the driver monitor camera 10 estimated by the camera orientation estimation unit 17, when determining the face orientation of the driver 9.

Similarly, the gaze point determination unit 19 does not necessarily require using the front-rear distance between the driver monitor camera 10 and the driver 9 estimated by the front-rear distance estimation unit 16, when determining the gaze point of the driver 9. In addition, the gaze point determination unit 19 does not necessarily require using the orientation of the driver monitor camera 10 estimated by the camera orientation estimation unit 17, when determining the gaze point of the driver 9. The camera ECU 11 may not include the update processing unit 15, may not include the front-rear distance estimation unit 16, or may not include the camera orientation estimation unit 17.

The driver imaging device 1 may include a plurality of the driver monitor cameras 10. The driver monitor camera 10 may be provided on the steering column, or may be provided in the vicinity of a ceiling above an instrument panel. The driver monitor camera 10 may be provided on each of left and right front pillars (A pillars) of the vehicle V. Accordingly, the performance of determining the face orientation of the driver 9 can be improved by combining face images of the driver 9 captured from a plurality of angles (internally generating three-dimensional information, ensuring redundancy during backlighting, or the like). For example, the accuracy of determining at least one of a forward-looking state and a looking-aside state of the driver 9 can be improved. In addition, according to the driver imaging device 1, as described above, since the traveling direction D of the vehicle V can be estimated regardless of the mounting position of the driver monitor camera 10, an improvement in performance by a plurality of the driver monitor cameras 10 can be realized at low cost. According to the driver imaging device 1, even when the mounting position of the driver monitor camera 10 needs to be changed depending on the option specifications of the vehicle V or the mounting position of the driver monitor camera 10 needs to be changed depending on at least one of a height and a physique of the driver 9 of the vehicle V, the traveling direction D of the vehicle V can be estimated at low cost.

The traveling direction of the vehicle V estimated by the traveling direction estimation unit 14 may be stored, for example, in a non-volatile memory or the like. Accordingly, the efficiency of estimating the traveling direction D of the vehicle V, for example, when the vehicle V starts is improved.

What is claimed is:
1. A driver imaging device comprising:
a driver monitor camera fixed to a vehicle front side with respect to a driver's seat in a vehicle interior of a vehicle, and configured to capture an image of a driver, wherein the driver monitor camera includes a camera ECU, and
the camera ECU estimates a traveling direction of the vehicle based on at least one of acceleration information of an acceleration sensor of the vehicle and acceleration information of an in-camera acceleration sensor built into the driver monitor camera, estimates a front-rear distance between the driver monitor camera and the driver based on front-rear position information of the driver's seat, and determines a face orientation of the driver with respect to the traveling direction of the vehicle and a gaze point of the driver based on a face image of the driver captured by the driver monitor camera, the front-rear distance, and the estimated traveling direction.

2. The driver imaging device according to claim 1, wherein the camera ECU estimates the traveling direction of the vehicle based on at least one of angular speed information of a yaw rate sensor of the vehicle and angular speed information of a gyro sensor built into the driver monitor camera, in addition to the acceleration information.

3. The driver imaging device according to claim 2, wherein when the driver monitor camera is mounted on a steering column, the camera ECU performs an update process of an estimation result of the traveling direction of the vehicle when a steering position adjustment is performed by a steering position adjustment mechanism of the vehicle.

4. The driver imaging device according to claim 2, wherein the camera ECU estimates an orientation of the driver monitor camera from a disposition of vehicle interior equipment of the vehicle in an image based on the vehicle interior image captured by the driver monitor camera, and determines the face orientation of the driver and the gaze point of the driver based on the orientation of the driver monitor camera, the front-rear distance, the face image of the driver, and the estimated traveling direction.

5. The driver imaging device according to claim 1, wherein when the driver monitor camera is mounted on a steering column, the camera ECU performs an update process of an estimation result of the traveling direction of the vehicle when a steering position adjustment is performed by a steering position adjustment mechanism of the vehicle.

6. The driver imaging device according to claim 1, wherein the camera ECU estimates an orientation of the driver monitor camera from a disposition of vehicle interior equipment of the vehicle in an image based on the vehicle interior image captured by the driver monitor camera, and determines the face orientation of the driver and the gaze point of the driver based on the orientation of the driver monitor camera, the front-rear distance, the face image of the driver, and the estimated traveling direction.

7. The driver imaging device according to claim 1, wherein, when the driver's seat is an electric seat, the camera ECU estimates the front-rear distance based on a change in a front-rear position of the driver's seat with respect to a stored reference value.

8. The driver imaging device according to claim 1, wherein the camera ECU estimates the front-rear distance between the driver monitor camera and the driver from a disposition of vehicle interior equipment of the vehicle in an image based on the vehicle interior image captured by the driver monitor camera.

* * * * *